(12) United States Patent
Sachs

(10) Patent No.: US 6,240,397 B1
(45) Date of Patent: May 29, 2001

(54) METHOD FOR TRANSFERRING, RECEIVING AND UTILIZING ELECTRONIC GIFT CERTIFICATES

(76) Inventor: Arye Sachs, 110-45 Queens Blvd., Forest Hills, NY (US) 11375

( * ) Notice: Subject to any disclaimer, the term of this patent is extended or adjusted under 35 U.S.C. 154(b) by 0 days.

(21) Appl. No.: 09/251,818

(22) Filed: Feb. 17, 1999

(51) Int. Cl.$^7$ ............................................ G06F 17/60
(52) U.S. Cl. .............................. 705/27; 705/26; 705/14
(58) Field of Search .................................. 705/26, 14, 27

(56) References Cited

U.S. PATENT DOCUMENTS

| | | | |
|---|---|---|---|
| 4,809,837 | 3/1989 | Hayashi | 194/205 |
| 5,002,313 | * 3/1991 | Salvatore | 283/102 |
| 5,243,174 | * 9/1993 | Veeneman et al. | 235/381 |
| 5,500,514 | 3/1996 | Veeneman et al. | 235/381 |
| 5,537,314 | 7/1996 | Kanter | 364/406 |
| 5,625,562 | * 4/1997 | Veeneman et al. | 364/479.05 |
| 5,652,421 | 7/1997 | Veeneman et al. | 235/381 |
| 5,710,886 | 1/1998 | Christensen et al. | 395/214 |
| 5,754,981 | 5/1998 | Veeneman et al. | 705/26 |
| 5,870,718 | * 2/1999 | Spector | 705/26 |
| 5,970,474 | 10/1999 | LeRoy et al. | 705/27 |
| 5,984,180 | 11/1999 | Albrecht | 235/380 |

FOREIGN PATENT DOCUMENTS 0016227  3/2000  (WO) .

OTHER PUBLICATIONS

"Pilot On–the Spot Awards Program", A public document of US Dept of Commerce, Jul. 24, 1995.*
Gines, Karen; "Gift Certificates, Choice Value Service", Incentive, p85–92, Jul. 1998.*
Patent Abstracts of Japan, Application No. 01224001, Aug. 1989, Gift Certificate Issuance and Liquidation System.
Abstract of International Publication No. WO 00/36570, Method and Apparatus for Executing Electronic Commercial Transactions with Minors, Soloki et al.

* cited by examiner

Primary Examiner—Vincent Millin
Assistant Examiner—Jagdish N Patel
(74) Attorney, Agent, or Firm—Brian Roffe

(57) ABSTRACT

A method for transferring, receiving and utilizing an electronic gift certificate in which the gift certificate is generated by a giver, including a selection of the value thereof, the gift certificate is transmitted to a recipient without an indicia of the value of the gift certificate, and for use of the gift certificate, the recipient is presented with only items to be purchased with the gift certificate whose value does not exceed the value of the gift certificate such that the recipient of the gift certificate is able to select an item to purchase with the gift certificate without knowing the exact value of the gift certificate.

29 Claims, 4 Drawing Sheets

FIG. 3A  USE OF GIFT CERTIFICATE BY RECIPIENT
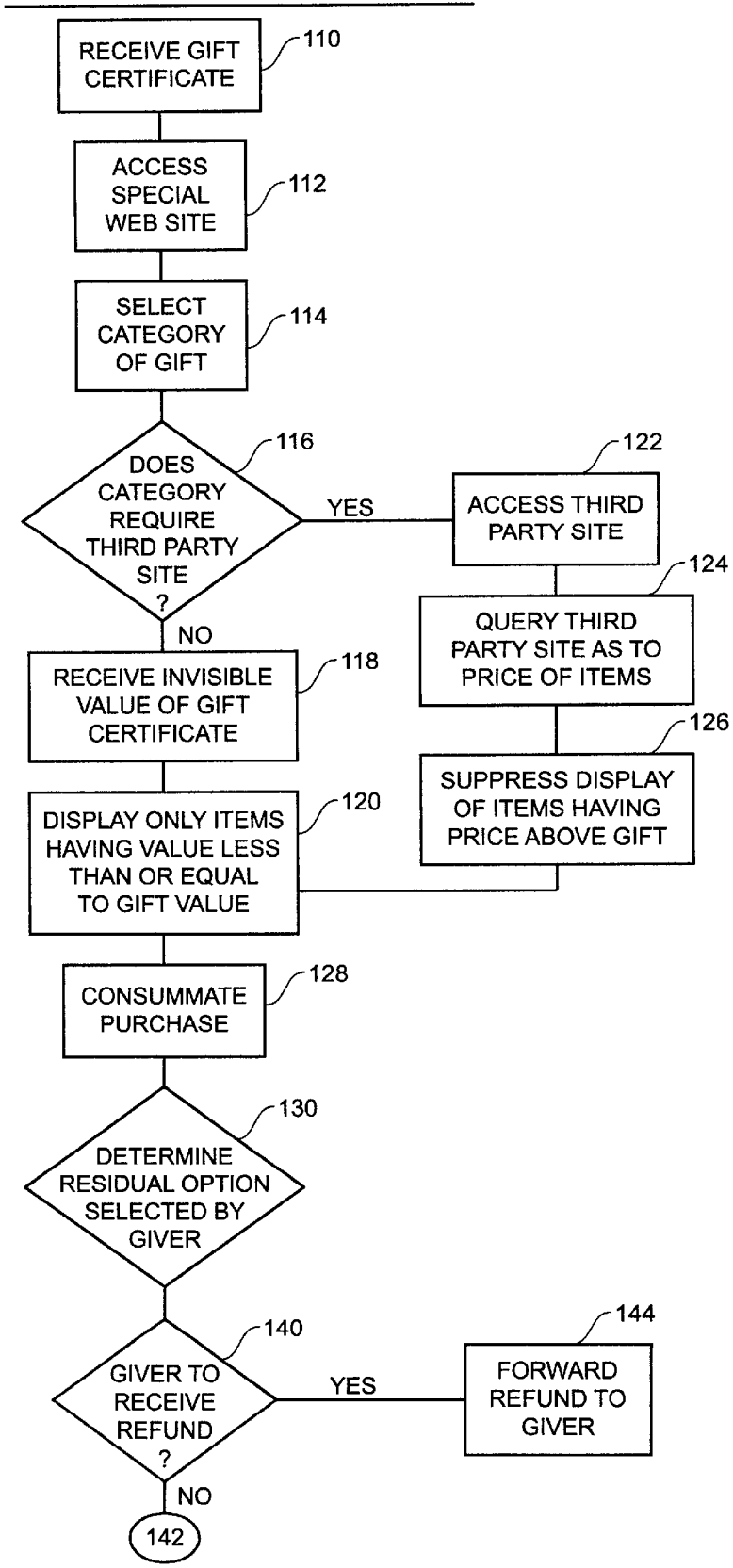

METHOD FOR TRANSFERRING, RECEIVING AND UTILIZING ELECTRONIC GIFT CERTIFICATES

BACKGROUND OF THE INVENTION

1. Field of the Invention

The present invention is generally related to the field of transferring, receiving and utilizing electronic gift certificates, and more particularly, to methods for transferring, receiving and utilizing electronic gift certificates over the Internet.

2. Description of Related Prior Art

A conventional gift certificate is a printed piece of paper that includes the value of the certificate and the stores or stores at which the gift certificate can be redeemed for merchandise. Employers and others often use it when they do not want to purchase an item that may not be favorably received by the intended recipient.

An e-mail gift certificate works much like a conventional gift certificate. It has a printed denomination value and its graphic image is transferred over the Internet to the designated recipient. The recipient can then redeem the certificate at any participating merchant. Such a gift certificate forces the sender and the recipient to:

a) disclose the exact amount of money the sender is "willing" to spend on the recipient.

b) choose only from products or services available from the participating merchant.

It is widely known that a disclosed price or a cash gift reduces the value of a gift to plain dollars and cents, i.e., it "cheapens" the gift by associating a specific dollar value thereto which is maximum the giver is willing to spend on the recipient. Unfortunately, the practice of giving an electronic gift certificate does not solve the problem since a dollar value is still associated with the certificate.

In a similar vein, for this reason, the price tag of a gift is invariably removed therefrom before the gift is wrapped so that the intended recipient is unaware of the cost of the gift. However, the recipient can obtain the price spent by the giver on the gift when the gift is returned. Indeed, it is often a problem with the proliferation of sales, that the exact amount spent on the gift by the giver is not necessarily the amount received by the recipient when returning the gift since the amount returned is often the lowest recent sales price. In such a case, the receipt may actually receive less than the giver paid and will not appreciate the monetary value of the gift to its fullest extent.

OBJECTS AND SUMMARY OF THE INVENTION

It is an object of the present invention to provide a new and improved method for transferring electronic gift certificates without the recipient knowing the value thereof It is another object of the present invention to provide a new and improved method for transferring and receiving electronic gift certificates without the recipient knowing or being able to readily ascertain the value thereof It is yet another object of the present invention to provide a new and improved method for utilizing electronic gift certificates whereby the recipient is able to purchase any item displayed to the recipient. In other words, items that cannot be purchased by the recipient with the gift certificate are not displayed to the recipient. This will avoid reducing the value of the gift certificate.

It is another object of the present invention to provide a consumer with the ultimate electronic shopping solution to the long existing problem of giving the perfect gift (a gift to be chosen by the recipient) while not disclosing the gift cost.

It is still another object of the present invention to provide a new and improved method for transferring, receiving and utilizing electronic gift certificates.

It is yet another object of the present invention to provide a method for transferring electronic gift certificates with denominations associated with the gift certificates while enabling the recipient to purchase items of their own selection, and items which the recipient could design themselves.

In order to attain these objects, and others, the method for transferring, receiving and utilizing an electronic gift certificate comprises the steps of the giver generating a gift certificate including the value thereof, transmitting the gift certificate to a recipient (e.g., via e-mail) without an indicia of the value of the gift certificate, and presenting the recipient with only items to be purchased with the gift certificate whose value does not exceed the value of the gift certificate. In this manner, the recipient of the gift certificate is able to select an item to purchase with the gift certificate without knowing the exact value of the gift certificate.

Since the value of the item purchased by the recipient may not equal the value of the gift certificate, the excess amount could be refunded to the giver, at the giver's option. Also, since the price of the items to be purchased is usually not exactly equal to the value of the gift certificate, the recipient could be presented with items to be purchased with the gift certificate whose value exceeds the value of the gift certificate by an amount predetermined by the giver.

In one manifestation, if the value of the item purchased by the recipient does not equal the value of the gift certificate, the value of the gift certificate is reduced by the value of the item purchased by the recipient, and the recipient is then presented with only additional items to be purchased whose value does not exceed the reduced value of the gift certificate. This may continue as long as a meaningful amount remains. The excess can then be refunded to the giver.

When generating the gift certificate, a card (possibly animated) and/or music to be sent with the gift certificate can also be selected. The giver can also be presented with options as to the use of the gift certificate by the recipient, e.g., whether to refund the excess value once a single item is purchased to the giver or enable multiple purchasers.

In particular embodiments, with respect to the presentation to the recipient with only items to be purchased with the gift certificate, when the recipient decides to use the gift certificate, the recipient is connected to a dedicated web site for allowing use of such gift certificates and the recipient is presented thereat with a plurality of different categories of items to be purchased such that the recipient is able to select a category of the item to be purchased, e.g., jewelry, books. Upon the recipient selecting a category of the item to be purchased, the recipient may be connected to an existing third party web site at which items in the selected category are displayed and sold. In this case, the prices of the items sold at the web site are determined by designing the program at the dedicated web site to query the third party web site (without the knowledge of the recipient) and if the price of an item sold at the third party web site is above the value of the gift certificate, display of the item is suppressed such that only items whose value does not exceed the value of the gift certificate are displayed, preferably without indicia of the price of the items. In the alternative, the third party web site could be designed to accept an "invisible" value of the gift certificate transmitted by the dedicated web site (without the knowledge of the recipient) and display only those items having a value less than or equal to the value of the gift certificate. The pre-sorting/pre-selecting of only those items having a value less than or equal to the value of the gift certificate can be done either at the third party web site (server) or at the dedicated web site by utilizing appropriate software together with data (e.g., electronic catalogs) obtained from the third party.

On the other hand, upon the recipient selecting a category of the item to be purchased, the recipient may be presented with subcategories of the item to be purchased and upon the recipient selecting at least one of the subcategories of items to be purchased, catalog items in the selected subcategory are presented without an indicia of the price of the items, the items having a value which does not exceed the value of the gift certificate.

The recipient may also be provided with an option to design an item in the selected subcategory and if the recipient opts to design an item in the selected subcategory, the recipient is provided with various design options for the item whereby only those design options which will result in the item having a value not exceeding the value of the gift certificate are presented.

In accordance with the invention, it is also possible to design a respective web site to display and offer for sale items in each category having a set maximum value. Upon the recipient selecting a category of the item to be purchased, the recipient is connected to one of the web sites at which items in the selected category and having a maximum value which does not exceed the value of the gift certificate are displayed and sold such that only items whose value does not exceed the value of the gift certificate are displayed.

BRIEF DESCRIPTION OF THE DRAWINGS

The following drawings are illustrative of embodiments of the invention and are not meant to limit the scope of the invention as encompassed by the claims.

FIGS. 3A and 3B comprise a flowchart of the manner in which the recipient uses a gift certificate in accordance with the invention.

DETAILED DESCRIPTION OF THE PREFERRED EMBODIMENTS

Figure 1:
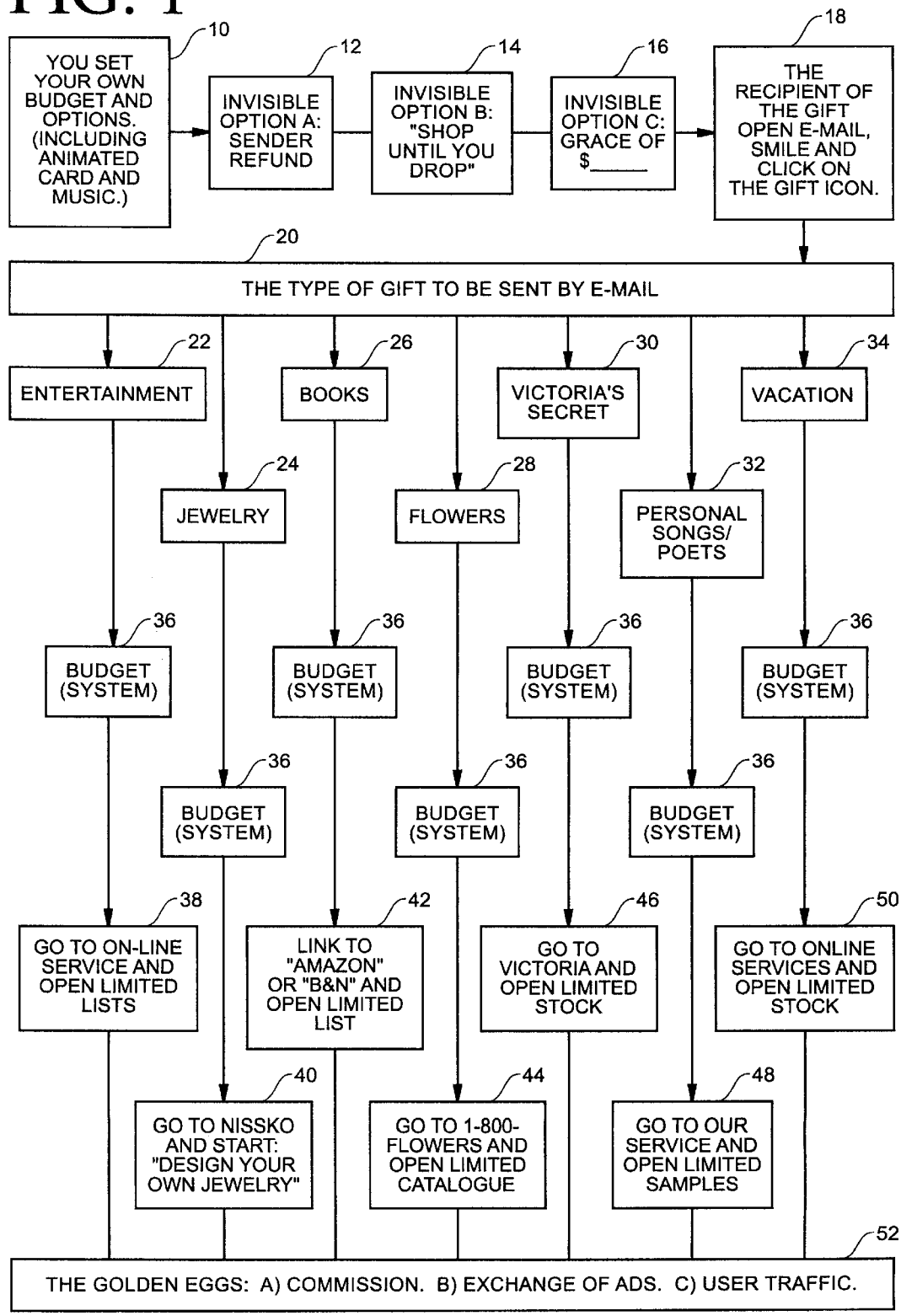
FIG. 1 is a flow chart of a method for transferring, receiving and utilizing electronic gift certificates in accordance with the invention.

Referring to the accompanying drawings wherein like reference numbers designate the same or similar elements, FIG. 1 shows a flow chart of the method in accordance with the invention. The method begins when a giver decides to send an electronic gift certificate using the method in accordance with the invention. The giver would access a web site and be presented with several options in order to customize the order (box 10). The options includes the type of e-mail message to convey the gift certificate (e.g., the type of card (animated or otherwise) and music (optional) to be sent to the intended recipient with the gift certificate) and the amount of the gift certificate. Also, the giver would be able to select different options for the use of the gift certificate, namely whether the giver will receive a refund if the purchase price of a single item purchased by the recipient does not equal the total value of the gift certificate (box 12), the recipient can purchase only a single object for a price up to but not exceeding the total value of the gift certificate (box 14), or the recipient can purchase multiple items (possibly from multiple participating merchants) where the combine cost is only a few dollars above the total value of the gift certificate (the grace option-box 16). The grace option could have an adjustable "grace" value to be determined by the giver. Also, an option could be provided to allow the recipient to use the gift certificate to purchase one or more items from one or more participating merchants until the aggregate purchase price equals the total value of the gift certificate.

The giver would then enter the payment information and the recipient e-mail address, and receive a confirmation number and log out. The gift certificate thus created would be sent to the recipient's e-mail address and would contain the card, music (optional) and identification of the giver. Also, the gift certificate would contain an icon enabling the use of the gift certificate and possibly also at least the identification of the merchants' web sites at which the gift certificate could be "redeemed".

It is an important feature of the invention that the gift certificate would not contain the amount thereof nor any identification of the options for the use thereof selected by the giver, e.g., the grace option, refund option, etc. Thus, the recipient would not know the value of the gift certificate.

The recipient would open his or her e-mail account and receive the denomination free (animated) e-mail gift certificate (box 18). When ready to use the gift certificate, the recipient would click on the gift icon and enter a dedicated web site for the use of such denomination-free gift certificates. Upon entering the dedicated web site, the recipient is presented with an array of gift categories to choose from (box 20), e.g., entertainment (box 22), jewelry (box 24), books (box 26), flowers (box 28), specific stores such as Victoria's Secret (box 30), personal songs/poems (box 32) and vacations (box 34).

Upon choosing a category, software is present at the site to analyze the "invisible information" carried with the gift certificate (budget, options etc.) (box 36). This information is "invisible" because it is not revealed to the recipient. However, it will be used subsequently to determine which merchandise to allow the recipient to preview and suppress or prevent the display of merchandise that cannot be purchased by the recipient utilizing the gift certificate.

Once a category is selected, in one embodiment, the recipient will jump to a predetermined third party web site relating to that category (boxes 38–50). At that third party web site, the recipient will be presented with an automatically pre-sorted, priceless catalogue (which resembles a conventional on-line catalogue). That is, the recipient will be shown only objects that can be purchased with the gift certificate and, the objects will not have prices associated therewith. This can be accomplished either by modifying the third party web site to accept a transmission of an invisible value of the gift certificate in this manner or by designing a special web site. In the first case, the third party web site could be modified in conjunction with the web site operator, or the additional, special web site could operate as an intermediary to filter out objects which cannot be purchased using the gift certificate. In the second case, the operator of the web site, e.g., amazon.com, could create a special affiliated web site which would be designed to query the recipient's computer as to the amount of the gift certificate and then operate to only display objects which can be purchased by the recipient using the gift certificate.

In both cases, the recipient will not become aware of the value of the gift certificate, nor of the value of the objects being purchased, and will have the opportunity to select a gift of his or her own choosing.

Additional advantages of this method include the possibility of a commission from the participating merchants, an exchange of advertisements and additional user traffic to the sites of the participating merchants (box 52).

Further, depending on the category chosen by the recipient, in certain categories, e.g., jewelry (box 24) an added option would allow the recipient to choose from one of the following two options:

standard catalogue, where the recipient can choose to receive one of the many gifts available from the pre-sorted catalogue; or "design your own" option, where the system will guide the recipient through all the required stages in order to design, assemble and create the desired gift.

Figure 2:
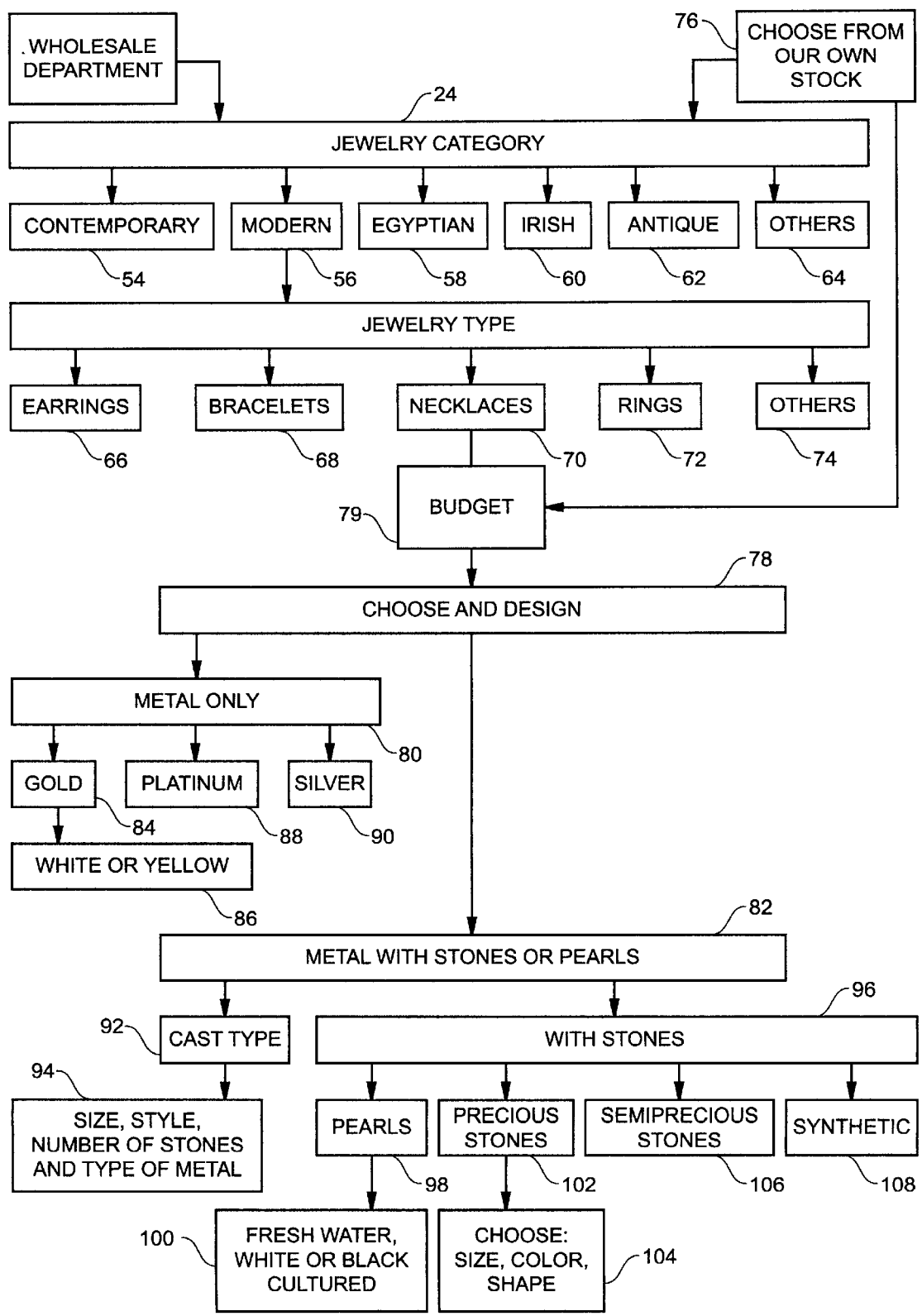
FIG. 2 is a flow chart of a method for utilizing the gift certificate in accordance with the invention.

This type of category is shown in FIG. 2. In this subsidiary method, which can either be used in conjunction with the method described above or independent thereof, at every stage and throughout the whole process, the system will pre-sort all the available components (presented to the designing recipient) in order to comply with the pre-set budget.

More specifically, upon entering the web site (or portion of the special web site described above since this may be a subcomponent thereof and avoid the need to jump to anther site), the recipient is present with an option to select his/her favorite jewelry category (contemporary (box 54), modern (box 56), Egyptian (box 58), Irish (box 60), antique (box 62), or others (box 64)). After selecting a jewelry category, the recipient is presented with options as to the type of jewelry (earrings (box 66), bracelets (box 68), necklaces (box 70), rings (box 72) and other articles (box 74)). After selecting the type of jewelry, the recipient is presented with an option of either selecting a piece of jewelry from stock (box 76) or custom designing a new piece of jewelry (box 78). If the recipient decides to select a piece of jewelry from stock, then only those pieces of jewelry having a purchase price less than the value of the gift certificate are displayed to the recipient (and without prices associated therewith). This is accomplished by use of the "invisible" value of the gift certificate being carried therewith (box 79). The system may be designed to determine which pieces of jewelry have prices below the value of the gift certificate during the selection process being performed by the recipient.

If the recipient decides to design a new piece of jewelry, the recipient is presented with several options, such as a metal only piece of jewelry (box 80) or a metal piece of jewelry with stones or pearls (box 82). In the first case, the recipient is presented with options for gold (white or yellow-boxes 84,86), platinum (box 88) or silver (box 90). In the second case, the recipient is presented with options for the cast type (box 92), i.e., the size, style, number of stones and type of metal (box 94), and the stones (box 96), e.g., pearls (box 98—freshwater, while or black cultured-box 100), precious stones (box 102—size, color and shape-box 104), semi-precious stones (box 106) and synthetic (box 108).

Once the recipient has made all of these selections (or at each stage in the selection process), the system can be designed to present the recipient with samples of jewelry casts, stones and pearls. This is done by utilizing "3-D" technology, allowing the designing recipient to move, rotate, and place each component into or near another component. The most convenient way to design a masterpiece on computer.

Additional features of the special site for purchasing jewelry described above include a game where the winner who guesses the cost of the gift wins the gift. Once the recipient is registered as having visited the site, the recipient could be sent a free reminder calendar of special, upcoming personal and business events in the hope that the recipient would use the gift certificate service to send gifts for such events. Also, a gift club could be established where friend and family could pledge their budget and the recipient could use it collectively to buy a gift of his or her choice in the manner described above. One additional feature could be an auction system for, e.g., estate jewelry. An educational site could also be incorporated into the special site and contain information about collections of jewelry, the history of jewelry and other gifts.

The step for the selection of a particular jewelry item does not necessarily have to be incorporated into the method for transferring, receiving and utilizing a gift certificate in accordance with the invention. Rather, a purchaser of jewelry could also utilize the site to obtain an item of jewelry. In one particular manifestation, the purchaser could input the maximum he or she wants to spend and the site would be designed to display only those items whose price does not exceed the budgeted amount. Of course, in this case, it is not absolutely required that the price of the items be hidden from the purchaser.

Figure 3B:
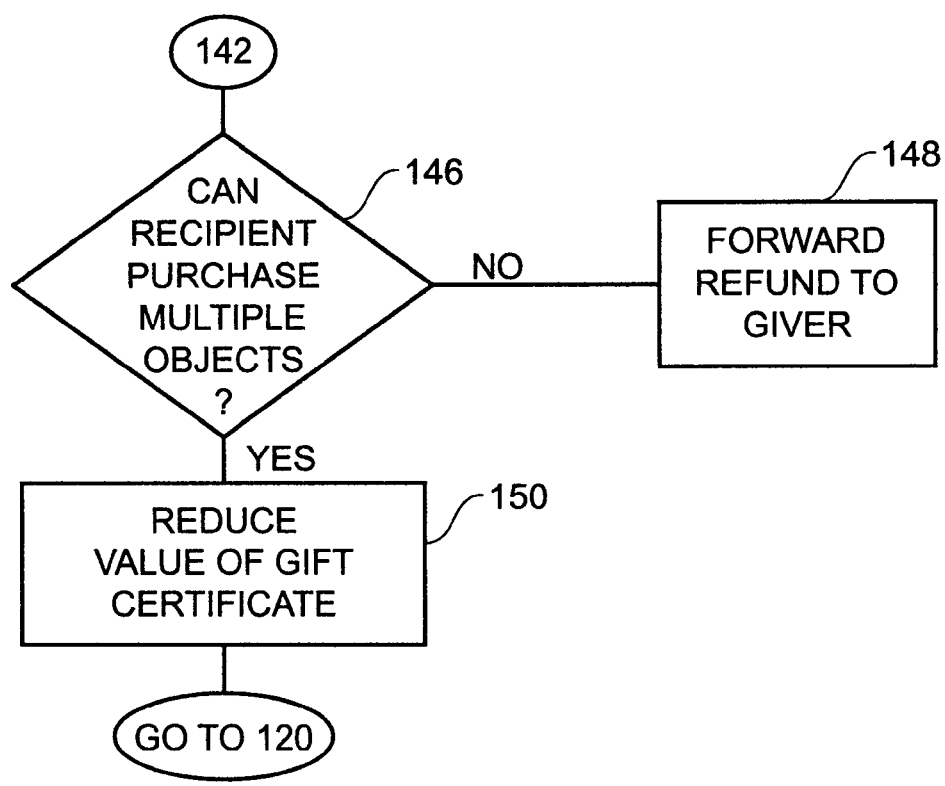

Referring now to FIGS. 3A and 3B, the manner in which the recipient will consummate the purchase using the gift certificate in accordance with the invention is illustrated. The recipient receives the gift certificate 110 and then accessing the dedicated web site 112. The recipient selects a category of a gift and then the program determines whether access to a third party site is required 116. If so, the third part web site is accessed 122, the catalog at that site is queried or interrogated (if the site is not designed for use with the system in accordance with the invention—i.e., it is not designed to display only items with a value less than or equal to a certain value) to ascertain the prices of the items for sale at that site 124 and the display of any item having a value above the value of the gift certificate is suppressed 126. As such, only items having a value less than or equal to the value of the gift certificate are displayed 120. If access to a third party site is not required, i.e., items of the selected category are available at the dedicated web site, the value of the gift certificate is received and processed by the program 118 and items having a value less than or equal to the value of the gift certificate are displayed 120. Thereafter, the purchase is consummated 128 and the residual option determined by the giver is determined 130, i.e., it is carried along as a tag with the gift certificate. A determination is made whether the giver receives a refund 140 and if so, the difference between the value of the purchased item and the value of the gift certificate is forwarded to the giver 144. If not, a determination is made whether the recipient can purchase multiple items (146—FIG. 3B). If not, the transaction is terminated and the difference is forwarded to the giver 148. If so, the value of the gift certificate is reduced by the value of the purchased item 150 and the program returns to box 120.

The program described herein can be implemented using any programming language based on the steps disclosed herein, assuming familiarity with electronic data communications. That is, it is necessary to design the gift certificate with a hidden tag or data package which contains the value of the gift certificate as well as the options selected by the giver which determine the use thereof.

I claim:

1. A method for transferring, receiving and utilizing an electronic gift certificate, comprising the steps of:
generating a gift certificate, the gift certificate being generated by a giver,
said step of generating the gift certificate comprising the step of selecting a value of the gift certificate,
transmitting the gift certificate to a recipient without an indicia of the value of the gift certificate visible to the recipient, and
presenting the recipient with only items to be purchased with the gift certificate whose value does not exceed the value of the gift certificate such that the recipient of the gift certificate is able to select an item to purchase with the gift certificate without knowing the exact value of the gift certificate.

2. The method of claim 1, further comprising the step of:
if the value of the item purchased by the recipient does not equal the value of the gift certificate, refunding the excess amount to the giver.

3. The method of claim 1, further comprising the steps of
presenting the recipient with items to be purchased with the gift certificate whose value exceeds the value of the gift certificate by an amount predetermined by the giver.

4. The method of claim 1, further comprising the step of:
if the value of the item purchased by the recipient does not equal the value of the gift certificate,
reducing the value of the gift certificate by the value of the item purchased by the recipient, and
presenting the recipient with only additional items to be purchased whose value does not exceed the reduced value of the gift certificate such that the recipient of the gift certificate is able to select an additional item to purchase with the gift certificate.

5. The method of claim 4, further comprising the step of:
if the value of the items purchased by the recipient does not equal the value of the gift certificate,
reducing the value of the gift certificate by the value of the additional item purchased by the recipient, and
presenting the recipient with only additional items to be purchased whose value does not exceed the reduced value of the gift certificate such that the recipient of the gift certificate is able to select an additional item to purchase with the gift certificate.

6. The method of claim 1, wherein the step of generating the gift certificate further comprises the step of selecting a card to be sent with the gift certificate.

7. The method of claim 1, wherein the step of generating the gift certificate further comprises the step of selecting music to accompany the gift certificate.

8. The method of claim 1, wherein the step of generating the gift certificate further comprises the step of presenting the giver with options as to the use of the gift certificate by the recipient.

9. The method of claim 8, wherein the options include an option to allow the recipient to purchase multiple gifts, an option to refund any remaining unused value of the gift certificate to the giver and an option to allow the recipient to purchase items for a predetermined value over the selected value of the gift certificate.

10. The method of claim 1, wherein the step of transmitting the gift certificate to the recipient comprises the step of transmitting the gift certificate to the recipient's e-mail address.

11. The method of claim 1, wherein the step of presenting the recipient with only items to be purchased with the gift certificate comprises the step of
presenting the recipient with a plurality of different categories of items to be purchased such that the recipient is able to select a category of the item to be purchased.

12. The method of claim 11, further comprising the steps of:
upon the recipient selecting a category of the item to be purchased, connecting the recipient to a web site at which items in the selected category are displayed and sold,
determining the prices of the items sold at the web site, and
if the price of an item sold at the web site is above the value of the gift certificate, suppressing display of the item such that only items whose value does not exceed the value of the gift certificate are displayed.

13. The method of claim 12, further comprising the step of:
displaying the items whose value does not exceed the value of the gift certificate without indicia of the price of the items.

14. The method of claim 11, further comprising the step of:
upon the recipient selecting a category of the item to be purchased,
presenting the recipient with subcategories of the item to be purchased,
upon the recipient selecting at least one of the subcategories of items to be purchased,
displaying catalog items in the selected subcategory whose value does not exceed the value of the gift certificate and without indicia of the price of the items.

15. The method of claim 11, further comprising the step of:
upon the recipient selecting a category of the item to be purchased,
presenting the recipient with subcategories of the item to be purchased,
upon the recipient selecting at least one of the subcategories of items to be purchased,
providing the recipient with an option to design an item in the selected subcategory,
if the recipient opts to design an item in the selected subcategory, providing the recipient with various design options for the item whereby only those design options which will result in the item having a value not exceeding the value of the gift certificate are presented.

16. The method of claim 11, further comprising the steps of:
designing a respective web site to display and offer for sale items in each category having a set maximum value,
upon the recipient selecting a category of the item to be purchased, connecting the recipient to one of the web sites at which items in the selected category and having a maximum value which does not exceed the value of the gift certificate are displayed and sold such that only items whose value does not exceed the value of the gift certificate are displayed.

17. The method of claim 16, further comprising the step of:
displaying the items whose value does not exceed the value of the gift certificate without indicia of the price of the items.

18. The method of claim 1, wherein said step of generating the gift certificate comprises the step of selecting a monetary value of the gift certificate.

19. A method for transferring, receiving and utilizing an electronic gift certificate, comprising the steps of:
   generating a gift certificate, the gift certificate being generated by a giver, said step of generating the gift certificate comprising the step of selecting a value of the gift certificate,
   transmitting the gift certificate to a recipient without an indicia of the value of the gift certificate, and
   presenting the recipient with only items to be purchased with the gift certificate whose value does not exceed the value of the gift certificate plus an amount predetermined by the giver such that the recipient of the gift certificate is able to select an item to purchase with the gift certificate without knowing the exact value of the gift certificate.

20. A method for transferring, receiving and utilizing an electronic gift certificate, comprising the steps of:
   generating a gift certificate, the gift certificate being generated by a giver, said step of generating the gift certificate comprising the step of selecting a value of the gift certificate,
   transmitting the gift certificate to a recipient without an indicia of the value of the gift certificate,
   presenting the recipient with only items to be purchased with the gift certificate whose value does not exceed the value of the gift certificate such that the recipient of the gift certificate is able to select an item to purchase with the gift certificate without knowing the exact value of the gift certificate, and
   if the value of the item purchased by the recipient does not equal the value of the gift certificate,
      reducing the value of the gift certificate by the value of the item purchased by the recipient, and
      presenting the recipient with only additional items to be purchased whose value does not exceed the reduced value of the gift certificate such that the recipient of the gift certificate is able to select an additional item to purchase with the gift certificate.

21. The method of claim 20, further comprising the step of:
   if the value of the items purchased by the recipient does not equal the value of the gift certificate,
   reducing the value of the gift certificate by the value of the additional item purchased by the recipient, and
   presenting the recipient with only additional items to be purchased whose value does not exceed the reduced value of the gift certificate such that the recipient of the gift certificate is able to select an additional item to purchase with the gift certificate.

22. A method for transferring, receiving and utilizing an electronic gift certificate, comprising the steps of:
   generating a gift certificate, the gift certificate being generated by a giver, said step of generating the gift certificate comprising the steps of selecting a value of the gift certificate and presenting the giver with options as to the use of the gift certificate by the recipient,
   transmitting the gift certificate to a recipient without an indicia of the value of the gift certificate, and
   presenting the recipient with only items to be purchased with the gift certificate whose value does not exceed the value of the gift certificate such that the recipient of the gift certificate is able to select an item to purchase with the gift certificate without knowing the exact value of the gift certificate.

23. The method of claim 22, wherein the options include an option to allow the recipient to purchase multiple gifts, an option to refund any remaining unused value of the gift certificate to the giver and an option to allow the recipient to purchase items for a predetermined value over the selected value of the gift certificate.

24. A method for transferring, receiving and utilizing an electronic gift certificate, comprising the steps of:
   generating a gift certificate, the gift certificate being generated by a giver, said step of generating the gift certificate comprising the step of selecting a value of the gift certificate,
   transmitting the gift certificate to a recipient without an indicia of the value of the gift certificate,
   presenting the recipient with only items to be purchased with the gift certificate whose value does not exceed the value of the gift certificate such that the recipient of the gift certificate is able to select an item to purchase, said step of presenting the recipient with only items to be purchased with the gift certificate comprising the step of presenting the recipient with a plurality of different categories of items to be purchased such that the recipient is able to select a category of the item to be purchased, and
   upon the recipient selecting a category of the item to be purchased.
      connecting the recipient to a web site at which items in the selected category are displayed and sold,
      determining the prices of the items sold at the web site, and
      if the price of an item sold at the web site is above the value of the gift certificate, suppressing display of the item such that only items whose value does not exceed the value of the gift certificate are displayed.

25. The method of claim 24, further comprising the step of:
   displaying the items whose value does not exceed the value of the gift certificate without indicia of the price of the items.

26. A method for transferring, receiving and utilizing an electronic gift certificate, comprising the steps of:
   generating a gift certificate, the gift certificate being generated by a giver, said step of generating the gift certificate comprising the step of selecting a value of the gift certificate,
   transmitting the gift certificate to a recipient without an indicia of the value of the gift certificate,
   presenting the recipient with only items to be purchased with the gift certificate whose value does not exceed the value of the gift certificate such that the recipient of the gift certificate is able to select an item to purchase, said step of presenting the recipient with only items to be purchased with the gift certificate comprising the step of presenting the recipient with a plurality of different categories of items to be purchased such that the recipient is able to select a category of the item to be purchased,
   upon the recipient selecting a category of the item to be purchased,
      presenting the recipient with subcategories of the item to be purchased, and upon the recipient selecting at least one of the subcategories of items to be purchased,
      displaying catalog items in the selected subcategory whose value does not exceed the value of the gift certificate and without indicia of the price of the items.

27. A method for transferring, receiving and utilizing an electronic gift certificate, comprising the steps of:

generating a gift certificate, the gift certificate being generated by a giver, said step of generating the gift certificate comprising the step of selecting a value of the gift certificate, transmitting the gift certificate to a recipient without an indicia of the value of the gift certificate, presenting the recipient with only items to be purchased with the gift certificate whose value does not exceed the value of the gift certificate such that the recipient of the gift certificate is able to select an item to purchase, said step of presenting the recipient with only items to be purchased with the gift certificate comprising the step of presenting the recipient with a plurality of different categories of items to be purchased such that the recipient is able to select a category of the item to be purchased, upon the recipient selecting a category of the item to be purchased,
presenting the recipient with subcategories of the item to be purchased, upon the recipient selecting at least one of the subcategories of items to be purchased,
providing the recipient with an option to design an item in the selected subcategory, and
if the recipient opts to design an item in the selected subcategory, providing the recipient with various design options for the item whereby only those design options which will result in the item having a value not exceeding the value of the gift certificate are presented.

28. A method for transferring, receiving and utilizing an electronic gift certificate, comprising the steps of:

generating a gift certificate, the gift certificate being generated by a giver, said step of generating the gift certificate comprising the step of selecting a value of the gift certificate, transmitting the gift certificate to a recipient without an indicia of the value of the gift certificate, presenting the recipient with only items to be purchased with the gift certificate whose value does not exceed the value of the gift certificate such that the recipient of the gift certificate is able to select an item to purchase, said step of presenting the recipient with only items to be purchased with the gift certificate comprising the step of presenting the recipient with a plurality of different categories of items to be purchased such that the recipient is able to select a category of the item to be purchased, designing a respective web site to display and offer for sale items in each category having a set maximum value, and upon the recipient selecting a category of the item to be purchased,
connecting the recipient to one of the web sites at which items in the selected category and having a maximum value which does not exceed the value of the gift certificate are displayed and sold such that only items whose value does not exceed the value of the gift certificate are displayed.

29. The method of claim 28, further comprising the step of:

displaying the items whose value does not exceed the value of the gift certificate without indicia of the price of the items.

* * * * *